United States Patent Office 3,060,151
Patented Oct. 23, 1962

3,060,151
MOLDING POWDER COMPRISING GLYCIDYL ETHERS OF DIHYDROXYDIPHENYLSULFONES
John E. Singley and George P. Whittle, Atlanta, Ga., assignors to Tennessee Corporation, New York, N.Y., a corporation of New York
No Drawing. Filed July 28, 1958, Ser. No. 751,194
3 Claims. (Cl. 260—49)

This invention relates to resinous compositions in comminuted or powdered form which are adapted to cure on heating and to form hard solid bodies.

Pulverulent resinous compositions of the above type are often referred to as molding powders and are well known. For example, solid epoxy resins and solid curing agents such as polyamines or polybasic organic acid anhydrides can simply be ground and mixed or otherwise suitably formed into pulverulent mixtures in the proper proportions for complete curing upon subsequent heating in a mold or the like. In other cases the resin and curing agent have been mixed and heated just enough to effect a partial cure to a friable state suitable for grinding, the cure being subsequently completed by heating the powder.

Such pulverulent mixtures have manifest advantages for many purposes. They can be stored indefinitely in bulk and used as needed from time to time without the need for measuring or weighing and mixing the individual ingredients. They provide a one-component system comprising both resin and curing agent, and if desired suitable pigment materials and/or inert fillers such as powdered metals, asbestos, mica, silica, chopped strand glass fibers and the like. The free-flowing powder can be handled with the greatest ease, needing only to be filled into the mold cavity or other space in which it is to be cured, usually with sufficient pressure at least to insure complete filling. Upon heating, the powdered material melts and the curing reaction takes place to form a hard solid body.

The present invention comprises an improved pulverulent mixture of the above type, using a particular type of resin and a particular curing agent which provides a molded casting having consistently good and in certain important respects superior properties.

In particular, the invention provides a molding powder such that the heat distortion temperature of the cured material not only is unusually high, but also is higher than the curing temperature required, so that the casting can be removed from the mold as soon as it has gelled and while still hot and allowed to cure in the open without losing its shape, instead of having to be left in the mold for several hours until curing is completed and then allowed to cool in the mold before it can be removed safely.

The application of Arvid Christiansen and John E. Singley, Serial No. 750,227, filed concurrently herewith on July 22, 1958, and entitled Curing Epoxy Resins, discloses and claims the use of phthalic anhydride as a curing agent for a group of epoxy resins formed by the condensation of epichlorohydrin with bisphenols of the type in which the two phenyl radicals are joined by means of an intermediate sulfone group. When the amount of phthalic anhydride is in the range of 55–75 phr. (parts by weight per hundred parts by weight of resin), and especially at the optimum of about 64 phr., the cured castings produced by this system exhibit unusually high heat distortion temperatures, e.g., 170–190° C., along with good flexural and compressive strengths. Moreover, optimum curing can be accomplished at temperatures as low as 150° C.

We have found that one of the resins referred to, which is a rather sticky solid that flows back together when broken up, nevertheless forms a physical mixture with phthalic anhydride that remains a free-flowing powder even after storage at elevated temperatures and pressures.

The epoxy resin mentioned is identified hereinafter and in the aforesaid Christiansen and Singley application as Z-200. It is made by reacting epichlorohydrin with bisphenol S, a commercial mixture of about 80% 4,4'-dihydroxydiphenyl sulfone and 20% 2,4'-dihydroxydiphenyl sulfone. It can be represented by the following formula

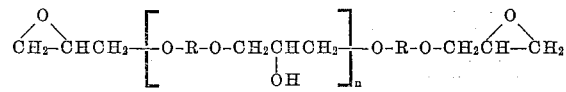

where R is the divalent hydrocarbon radical of bisphenol S. When $n=0$, the compound of the formula is the diglycidyl ether of bisphenol S. The value of $n$ increases as polymerization proceeds and molecular weight increases. For the purpose of making castings as disclosed in the Singley and Christiansen application and in the present case, $n$ should be greater than zero and less than 1.0, preferably in the range of 0.05 to 0.50.

We have also found that resin Z-200 can be ground with certain other solid curing agents in suitable proportions to provide molding powder compositions similar to that obtained with phthalic anhydride. These curing agents are listed below, together with their optimum proportions expressed as phr.:

| | Phr. |
|---|---|
| (1) Diaminodiphenyl sulfone | 31 |
| (2) Diaminodiphenylmethane | 25 |
| (3) Dicyandiamide | 10 |
| (4) Maleic anhydride | 25 |
| (5) Succinic anhydride | 48 |
| (6) Pyromellitic dianhydride | 31 |

At these optimum proportions, or within a reasonable tolerance of say 15–20% above or below the same, molding powders are obtained that are useful for many purposes, although as castings some of their properties and particularly their heat distortion temperatures are inferior to those of castings made with the phthalic anhydride–Z-200 system described more fully below.

When resin Z-200 and phthalic anhydride are combined in the above prescribed proportions, a free-flowing molding powder is obtained that can be used to make castings having the properties and advantages mentioned above and hereinafter. By way of example, 200 parts of Z-200 and say 142 parts of phthalic anhydride are placed in a ball mill and ground together to approximately 20 mesh size. It will be understood, of course, that the proportion of curing agent to resin may vary as stated above, and also that any of various fillers may be ground along with the resin and curing agent.

The powder thus obtained remains free flowing even after storage for some time at elevated temperatures and pressures. The physical mixture has a melting point substantially lower than either component, i.e., about 120° C. as compared to 135° C. for phthalic anhydride and 150° C. for resin Z-200. Thus the powder can be placed in the mold, under pressure if desired, and melted in the mold at 120° C., or it can be melted at this temperature outside the mold and poured into the mold in liquid form.

In general, castings made from the molding powder of the present invention will be cured at a temperature in the range of 150° C.–250° C. Typical curing conditions for the resin-curing agent mixture are four hours at 150° C. At this temperature, with an optimum proportion of curing agent, the liquified mixture gels practically immediately and has an HDT as high as 170° C. Further curing up to about 3–4 hours may raise the HDT another 15-20° C., beyond which further heating has not effect. The cured castings have unusually good heat distortion temperatures, accompanied at the same time by good flexural and compressive strengths and other properties. The following results are typical of the properties of such castings:

| Amount Phthalic Anhydride, phr. | Curing Conditions, Hrs./temp. °C. | HDT, °C. | Flexural Strength, p.s.i. | Compressive Strength, p.s.i. |
|---|---|---|---|---|
| 71.0 | 2/250 | 186.5 | 10,000 | |
| 71.0 | 24/150 | 180.5 | | |
| 60.0 | 6/200 | 194.0 | 8,000 | |
| 71.0 | 4/150 | 180.0 | 10,000-13,000 | |
| 64.0 | 2/150 | | | 23,000 |
| 64.0 | 4/150 | | | 24,000 |
| 64.0 | 8/150 | | | 25,000 |

Molding powders as described above are particularly advantageous. In the first place, they gell practically immediately in the mold. In the second place, the HDT of the gelled casting is substantially higher than the temperature required to melt the mixture. Accordingly the casting can be removed promptly from the mold and will continue to cure due only to its residual heat. Thus no curing ovens or like equipment are required.

Another advantage is evident from the formula set forth above and the fact that the value of $n$ is less than one. As a consequence the number of hydroxyl groups is low and problems of mold release are simplified because of the correspondingly low degree of adhesion of the casting to the mold.

As already stated, the powder possesses the additional advantages of providing a one-component system with indefinite shelf lift that can be used from time to time as may be desired without the necessity of weighing or mixing the ingredients.

It is to be understood that the invention is not restricted to the details of the foregoing description and that reference should be had to the appended claims for a definition of its limits.

What is claimed is:

1. A heat-curable molding powder composition in the form of a substantially free-flowing powder comprising a physical mixture of (A) the reaction product of epichlorohydrin with a dihydroxy-diphenyl sulfone having approximately 80% of the formula

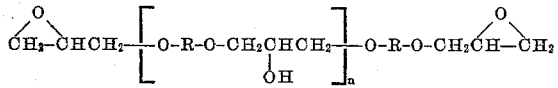

where R stands for

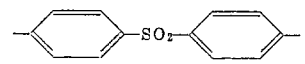

and $n$ has an average value greater than zero but less than one, and having approximately 20% of the formula

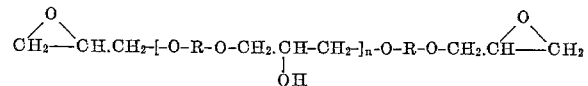

wherein $n$ has the same value as above and R stands for

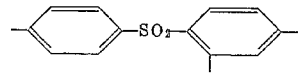

and (B) a curing agent selected from the group consisting of the following members in an amount between 80% and 120% of the stated optimum parts by weight per hundred parts by weight of resin values: phthalic anhydride, 64 parts by weight per hundred parts by weight of resin; diaminodiphenyl sulfone, 31 parts by weight per hundred parts by weight of resin; diaminodiphenylmethane, 25 parts by weight per hundred parts by weight of resin; maleic anhydride, 25 parts by weight per hundred parts by weight of resin; succinic anhydride, 48 parts by weight per hundred parts by weight of resin; and pyromellitic dianhydride, 31 parts by weight per hundred parts by weight of resin.

2. A heat-curable molding powder composition for plastic castings in the form of a substantially free-flowing powder comprising a physical mixture of (A) approximately 80% of the reaction product defined in (A) of claim 1, and (B) between 55 and 75 parts by weight of phthalic anhydride per hundred parts by weight of resin (A).

3. A composition as defined in claim 2 wherein the value of $n$ is between 0.05 and 0.50 and the amount of phthalic anhydride is about 64 parts by weight per hundred parts by weight of said resin (A).

References Cited in the file of this patent

UNITED STATES PATENTS

| 2,694,694 | Greenlee | Nov. 16, 1954 |
| 2,765,322 | Beavers | Oct. 2, 1956 |
| 2,767,157 | Masters | Oct. 16, 1956 |
| 2,773,048 | Formo et al. | Dec. 4, 1956 |
| 2,809,184 | Langer | Oct. 8, 1957 |
| 2,839,495 | Carey | June 17, 1958 |
| 2,853,468 | Steckler | Sept. 23, 1958 |
| 2,890,189 | Greenlee | June 9, 1959 |

OTHER REFERENCES

Lee et al.: Epoxy Resins, McGraw-Hill (1957), pages 15-17, 30-31, 41-53, 115-133 and 190-192. (Copy in Sci. Lib.)